June 18, 1935.  A. E. W. JOHNSON  2,005,547
TILLAGE DISK BEARING
Filed Feb. 23, 1934
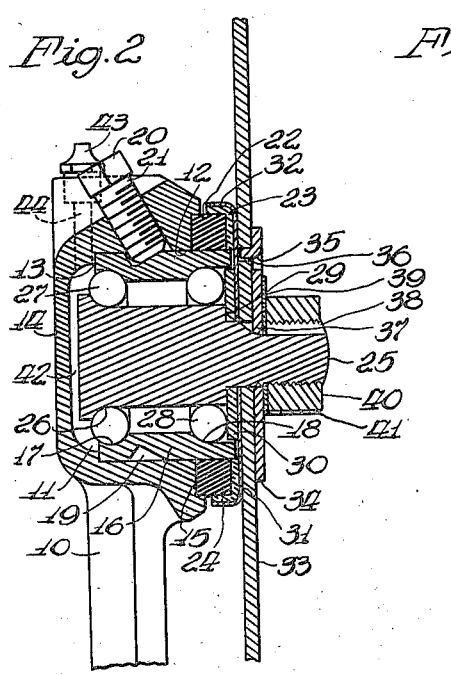
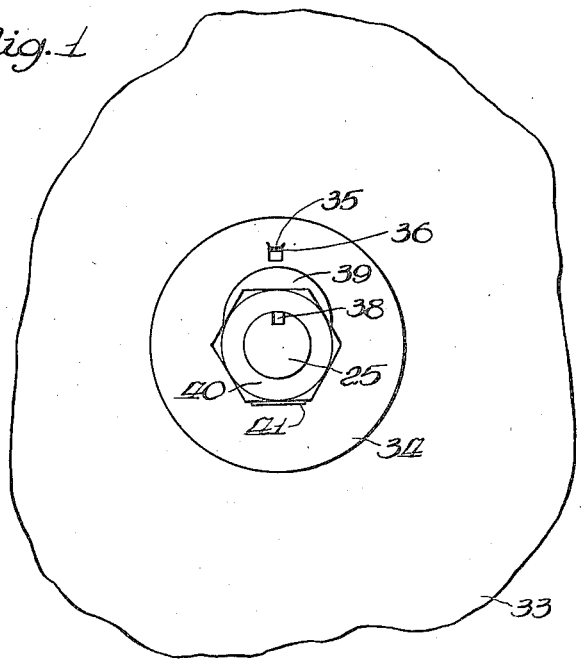
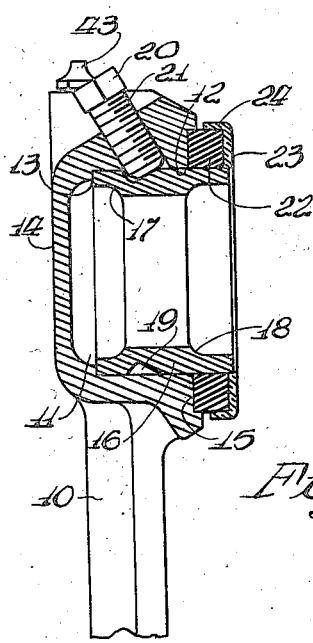
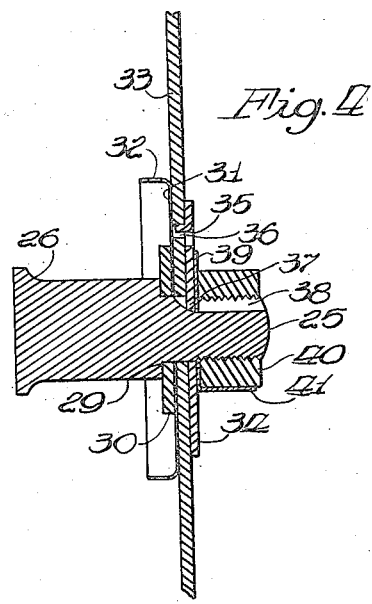
Inventor
Arnold E. W. Johnson Patented June 18, 1935

2,005,547

UNITED STATES PATENT OFFICE 2,005,547

TILLAGE DISK BEARING

Arnold E. W. Johnson, Chicago, Ill., assignor to International Harvester Company, a corporation of New Jersey Application February 23, 1934, Serial No. 712,498

5 Claims. (Cl. 308—187)

This invention relates to a bearing construction. More specifically it relates to a ball bearing construction and sealing means therefor adapted for use in mounting grain drill disks or similar rotating elements.

In the provision of bearings for the furrow opening disks of grain drills and in similar locations where loose dirt is continually falling around the bearing, great difficulty has been encountered in providing bearings and seals therefor which protect the bearings from dirt sufficiently to prevent excessive wear and subsequent ruin of the bearing.

The object of the present invention is to provide a bearing construction and sealing means therefor which are effective to prevent entrance of dirt to the bearing and escape of grease therefrom for a long period of use. Another object is to provide in combination with the bearing structure a bearing spindle mounting device for a disk which structurally cooperates with the bearing races and the sealing means to form a simple unitary and compact structure. Another object is to provide a bearing structure which can be inserted and removed as a unit from a supporting means at the same time forming a dust and soil seal when placed in mounted position. These objects and others which will be apparent from the detailed description to follow are attained by a construction such as shown in the drawing, in which:

Figure 1 is a side elevational view showing a portion of a disk and an end view of the bearing spindle on which the disk is mounted;

Figure 2 is a cross section showing the disk of Figure 1, a supporting standard or shank, and the elements making up the structure and embodying the invention;

Figure 3 is a cross sectional view showing the stationary portions of the supporting means, the ball bearing, race structure, and the sealing means; and, Figure 4 is a cross section showing the rotating part of the structure shown in Figure 2 removed from its operative position.

The particular embodiment of the invention illustrated is designed for the furrow opening disk of a grain drill or other furrow opening implement. In the present embodiment of the invention there is a shank or standard 10, which may be a casting, formed with a cup-shaped bore 11 open at one end and closed at the other. The cylindrical wall 12 of said bore is of a uniform diameter terminating in an annular shoulder 13 adjacent the back wall 14. An annular recess 15 is formed on the open side of the bore around the cylindrical wall 12.

Double row ball bearings, formed to take both axial and radial loads, are conventionally constructed with an outer race ring containing two spaced raceways and an inner race ring containing two cooperating raceways. In the construction illustrated, the equivalent of the conventional double row ball bearing has been obtained by a construction particularly designed for the specific installation. The outer race ring of the double row ball bearing is formed by a cylindrical member 16 fitted into the bore 11, its cylindrical wall engaging the wall 12 and its inner end abutting the annular shoulder 13. The member 16 is formed with an inner raceway 17 and an axially spaced outer raceway 18. Said raceways are formed to take axial thrust toward the center of the member 16. An annular groove 19 formed around the member 16 intermediate its ends provides an abutment to be engaged by a set screw 20 threaded in an opening 21 extending through the bearing casing.

The outer end of the cylindrical bearing member 16 projects beyond the open end of the bearing casing in which the recess 15 is formed. An annular resilient member 22 is fitted in the recess 15 and around the projecting end of the member 16. Said member constitutes a part of the sealing means. A second annular sealing member 23 L-shaped in cross section is fitted over the projecting end of the cylindrical member 16 against the resilient member 22 with a flange 24 overlapping in an axial direction the peripheral face of the member 22. As shown in Figure 3, the axial face of the sealing member 23 normally extends beyond the projecting end of the member 16.

The rotating part of the structure as disclosed is shown separately in Figure 4 and in assembled position in Figure 2. A stub shaft or spindle 25 is enlarged at one end and formed adjacent said enlargement with a bearing race 26. Said race cooperates with the inner race 17 of the bearing member 16 to form a raceway for the inner row of balls 27. The diameter of the spindle 25 is such as to form, in cooperation with the outer raceway 18 of the bearing member 16, a raceway for the outer row of balls 28.

The outer end of the spindle 25 is reduced in diameter, forming a shoulder 29. A hardened bearing plate 30 fitted against said shoulder cooperates with the cylindrical surface of the spindle to complete a raceway for the row of balls 28. A shield 31 having a central aperture fitted over the reduced end of the spindle 25 abuts the bearing plate 30 and extends radially outwardly beyond the sealing member 23, being formed with an axially directed flange 32 overlapping the flange 24 on said sealing member. A disk 33, only the center portion of which is shown in the drawing, is fitted over the reduced end of the spindle 25 abutting the shield 31. A locking member 34 is provided with a bent down tongue 35 which engages an opening 36 in the disk to prevent relative rotation of the disk and the locking member. At the center, the locking member 34 is provided with a tongue 37 which fits into a keyway 38 formed in the reduced end portion of the spindle 25, thereby preventing relative rotation of the locking member with respect to the spindle. A lock washer 39 is fitted against the locking member 34, and a nut 40 is threaded on the reduced end of the spindle securely clamping all of the elements on the spindle together against each other and against the abutment 29. The lock washer 39 has a tongue 41 bent up after the nut 40 has been tightened to prevent accidental loosening of the nut.

It will be noted that, in addition to the space between the balls 27 and 28, a space 42 is formed between the inner end of the spindle 25 and the end wall 14. To introduce lubricant into this space, a conventional high pressure lubricating nipple 43 is threaded into the supporting casing, being in communication with a lubricant conduit 44 leading into the lubricant space.

With the bearing construction assembled with the balls in position the sealing member 24 and the cooperating member 23 may be fitted over the cylindrical member 14, which is then inserted into the bore 11 and secured therein by the set screw 20. The member 22, which is preferably formed of rubber or a similar resilient material, is seated in the recess 15 forming a seal therewith and the outer projecting end of the member 16 forming a seal with that element. Said member also abuts the radial face of the sealing member 23 and the inner surface of the flange 24 formed on said member, forming a seal therewith. It will be noted that there is a space between the flange 24 and the portion of the casing around the recess 15. This provides for a certain amount of resiliency without engagement of the sealing member flange with the casing.

As previously pointed out, the sealing member 23, which is preferably formed of specially prepared leather or fiber, which has the property of holding a lubricant, engages the radial face of the shield 31 and the flange 32 of said shield. Pressure exerted by the resilient member 22 on the sealing member 23 urges it both axially and radially against the cooperating parts of the sealing flange 31. As the flange 24 of the sealing member and the flange 32 of the shield terminate in the same plane, there is very little tendency for dust or dirt to work axially between said flanges, especially as they are resiliently urged in contact by the resilient member 22.

Although applicant has shown and described in detail a particular seal having certain portions of different elements cooperating, it is to be understood that there may be variation in shapes or formation of the sealing elements which come within the scope of the present invention. Applicant claims, therefore, as his invention all modifications falling within the scope of the appended claims.

What is claimed is:

1. A bearing construction comprising a stationary portion having a bearing surface formed therein and a shoulder concentric with the bearing surface and spaced from one end thereof, a bearing spindle rotatably mounted against axial movement in cooperation with the bearing surface, a sealing member rigidly mounted on said spindle, said member having an annular radially extending portion and a cylindrical flange extending axially from the periphery of the annular portion toward the shoulder on the stationary bearing portion, a resilient sealing member abutting the shoulder and both portions of the first named sealing member, and an L-shaped friction reducing element fitted over the resilient member and forming the engaging surface with the flanged sealing member.

2. A bearing construction comprising a casing having a bore formed therein, a cylindrical member mounted in said bore and projecting therefrom, a spindle rotatably mounted in the cylindrical member against axial movement with respect thereto, a sealing member mounted for rotation with the spindle, said member having a circular portion extending radially beyond the cylindrical member and a cylindrical portion extending axially towards the casing and being concentric with the bearing member, a resilient packing member mounted around the circular member abutting the surrounding portion of the casing and both the circular and cylindrical portions of the first named sealing member, and an annular friction reducing member L-shaped in cross section contacting the resilient member and the sealing member.

3. A bearing construction comprising a casing having a bore formed therein, a cylindrical member mounted in said bore and projecting therefrom, said member being formed with inner and outer ball races, a bearing spindle mounted in the cylindrical member having a bearing race at its inner end cooperating with the inner ball race on the cylindrical member, a series of balls arranged between the cooperating inner races, a second series of balls arranged around the bearing spindle contacting with the outer race of the cylindrical member, a shoulder formed on the bearing spindle, an annular thrust washer abutting said shoulder and the outer row of balls, a sealing member abutting said thrust member and extending radially outwardly beyond the outer end of the cylindrical member in clearance relation with respect thereto, and an annular resilient packing member surrounding the projecting portion of the cylindrical member and abutting the casing and the first named sealing member.

4. A bearing construction comprising a casing having a cup-shaped bore formed therein, a cylindrical member mounted in said bore and projecting therefrom, said bore being formed with inner and outer ball races, a bearing spindle mounted in the cylindrical member having a bearing race at its inner end cooperating with the inner ball race on the cylindrical member, a series of balls arranged between the cooperating inner races, a second series of balls arranged around the bearing spindle contacting with the outer race of the cylindrical member, a shoulder formed on the bearing spindle, an annular thrust washer abutting said shoulder and the outer row of balls, a sealing member abutting said thrust member and extending radially outwardly beyond the outer end of the cylindrical member in clearance relation with respect thereto, said member being formed with an inturned flange around its periphery terminating in clearance relation with respect to the casing, and an annular resilient packing member surrounding the projecting portion of the cylindrical member and abutting the casing and inturned flange of the first named sealing member.

5. A bearing construction comprising a casing having a cup-shaped bore formed therein, a cylindrical member mounted in said bore and projecting therefrom, said member being formed with inner and outer ball races, a bearing spindle mounted in the cylindrical member having a bearing race at its inner end cooperating with the inner ball race on the cylindrical member, a series of balls arranged between the cooperating inner races, a second series of balls arranged around the bearing spindle contacting with the outer race of the cylindrical member, a shoulder formed on the bearing spindle, an annular thrust washer abutting said shoulder and the outer row of balls, a sealing member abutting said thrust member and extending radially outwardly beyond the outer end of the cylindrical member in clearance relation with respect thereto, said member being formed with an inturned flange around its periphery terminating in clearance relation with respect to the casing, an annular resilient packing member surrounding the projecting portion of the cylindrical member and abutting the casing, a flanged sealing member fitted between said packing member and the first named sealing member, a disk mounted on the bearing spindle, and a threaded member for securing the disk, the sealing flange and the thrust member securely in position.

ARNOLD E. W. JOHNSON.